Dec. 14, 1926.                                                1,610,376
                          H. F. HITNER
              PROCESS AND APPARATUS FOR MAKING GLASS
                   Filed August 20, 1925    3 Sheets-Sheet 1
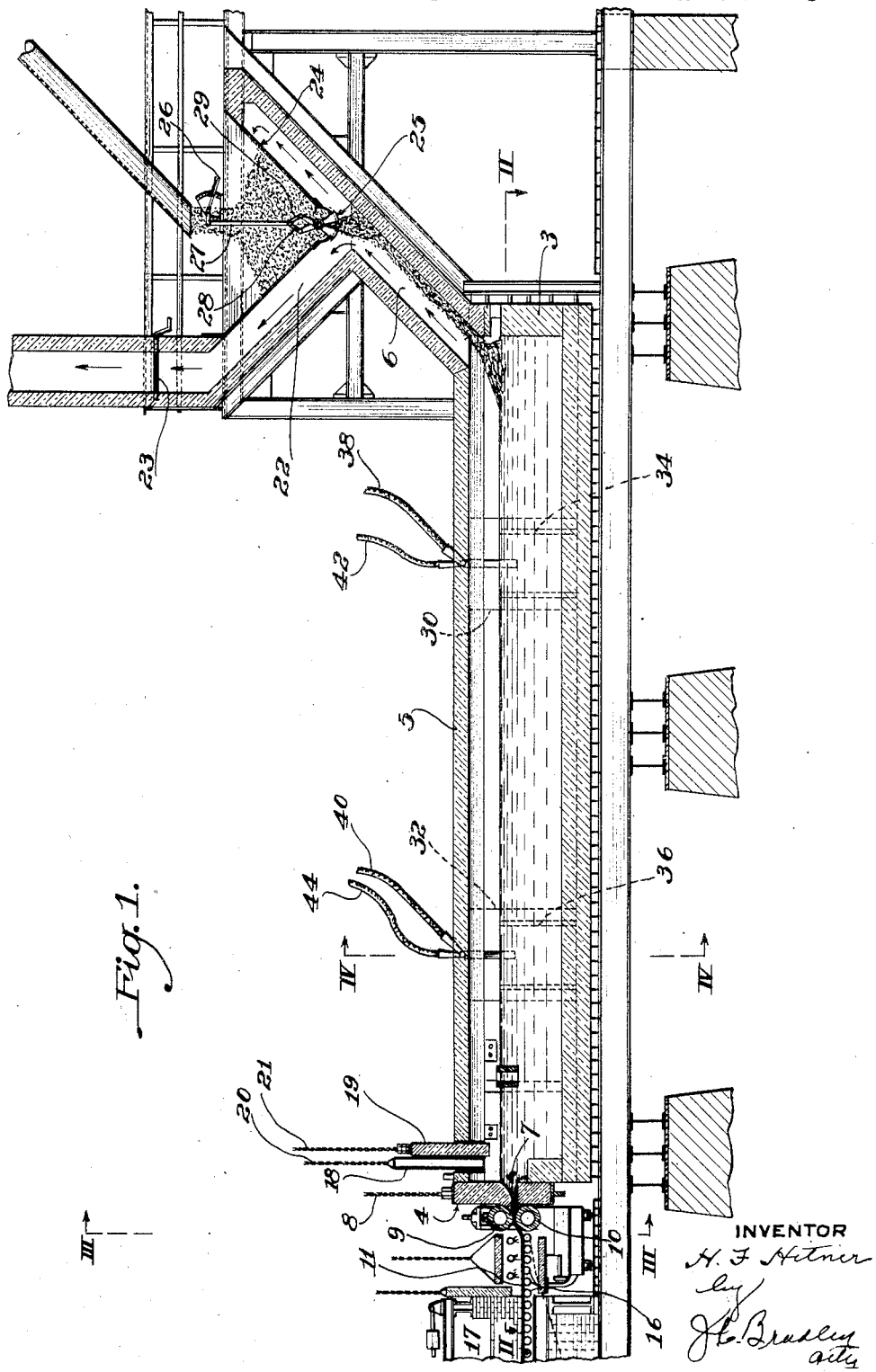
INVENTOR

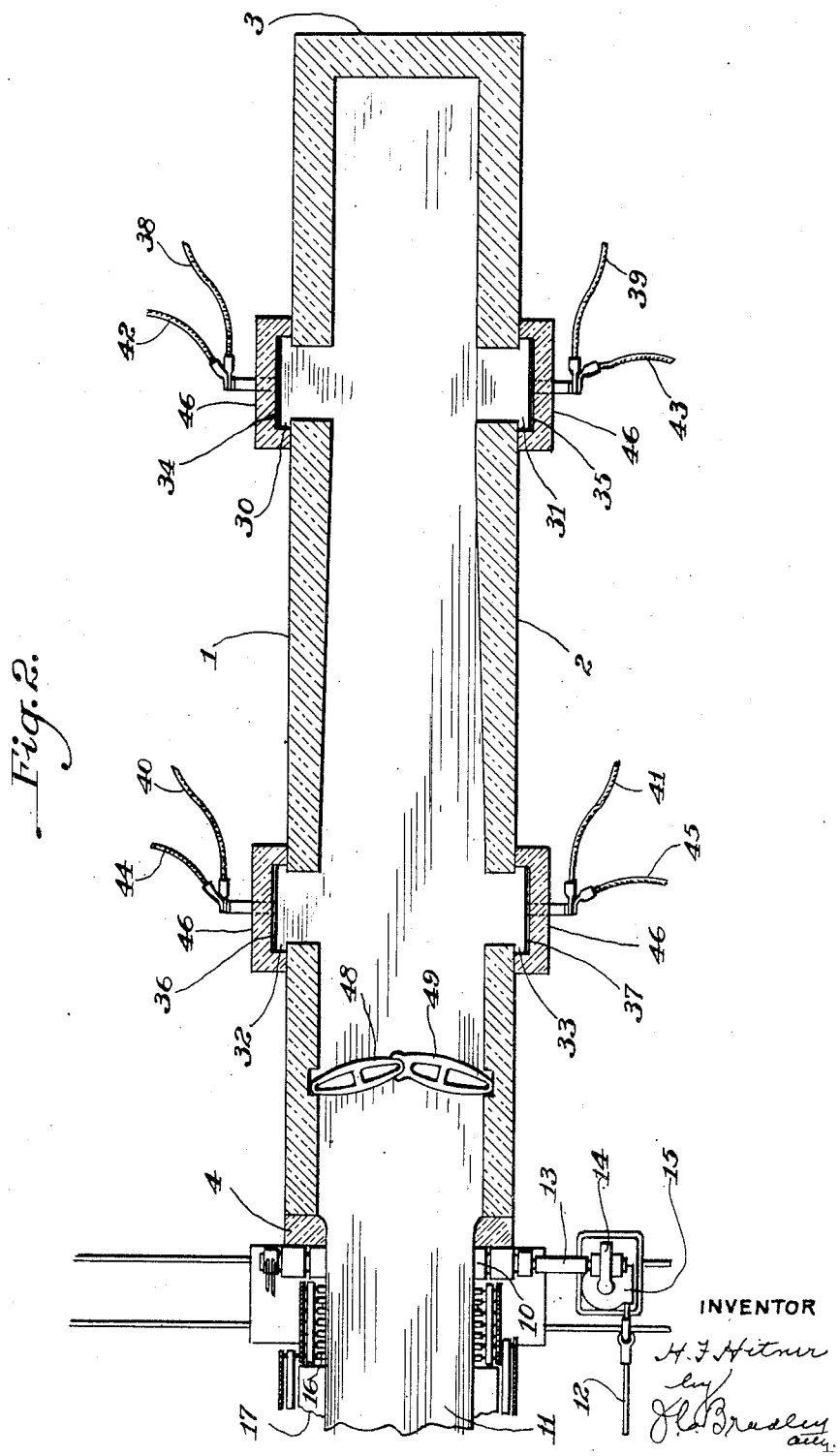

Dec. 14, 1926.  
H. F. HITNER  
1,610,376  
PROCESS AND APPARATUS FOR MAKING GLASS  
Filed August 20, 1925   3 Sheets-Sheet 3
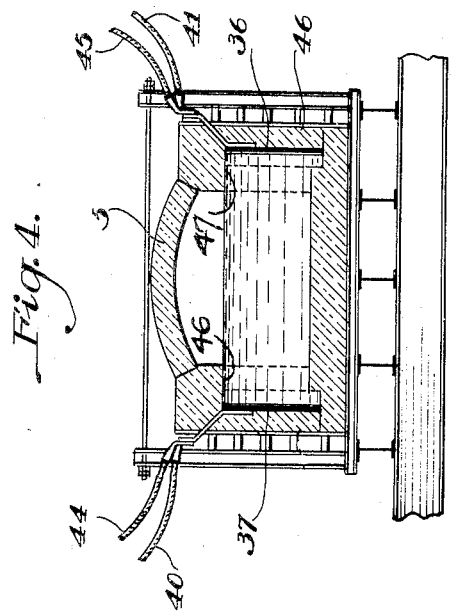
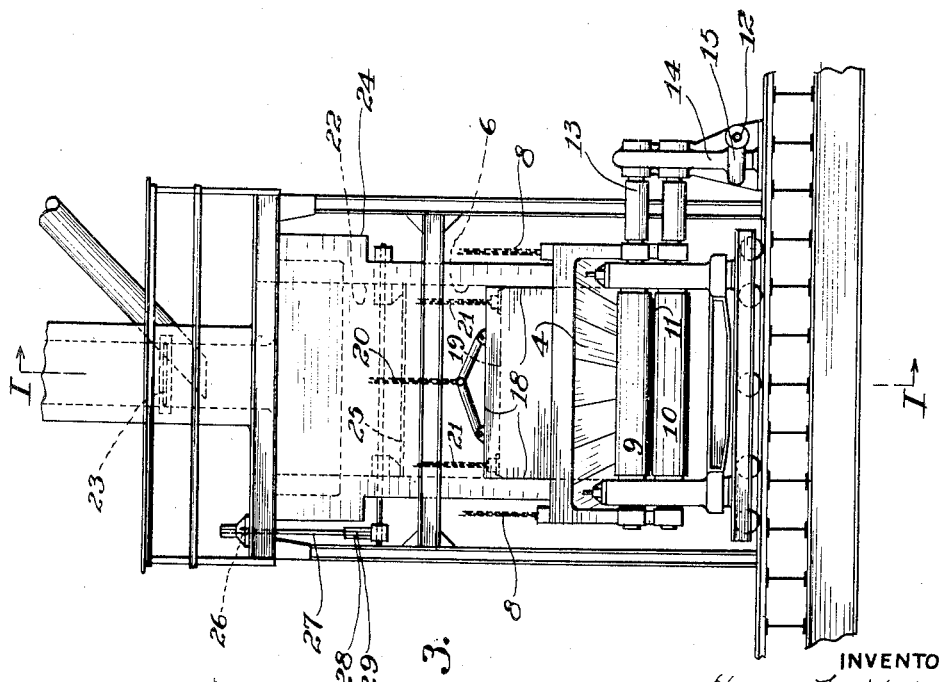
INVENTOR  
Harry F Hitner  
by  
James C. Bradley  
Atty Patented Dec. 14, 1926.

1,610,376

UNITED STATES PATENT OFFICE.

HARRY F. HITNER, OF PITTSBURGH, PENNSYLVANIA, ASSIGNOR TO PITTSBURGH PLATE GLASS COMPANY, A CORPORATION OF PENNSYLVANIA.

PROCESS AND APPARATUS FOR MAKING GLASS.

Application filed August 20, 1925. Serial No. 51,324.

The invention relates to a process and apparatus for making glass by the use of electricity as a melting and fining agency, the object being to utilize the current so as to melt the batch and fine the glass economically and to produce a product of high quality and with little or no discoloration incident to the contact of the glass with the electrodes. In its preferred form the apparatus comprises an elongated tank provided at its forward end with glass delivery means, such as a slot and sizing rolls, and at its other end with batch feeding means arranged so that the hot gases from the tank may be utilized to heat the incoming batch. A plurality of pairs of bays are provided at intervals along the side walls of the tank, and at the inner sides of these bays are the electrodes by means of which the current for reducing the glass is supplied thereto. These electrodes are in the form of flat plates of heat resisting metal located at the inner ends of the bays and backed up by relatively thin plates of clay. These features of construction contribute toward maintaining the electrodes at a lower temperature than would otherwise be the case, so that the corrosive action of the glass upon the electrodes is reduced. The current is preferably caused to flow longitudinally of the tank from one pair of the electrodes to the next pair, and in addition current at a different voltage may be caused to flow transversely of the tank from the electrodes on one side to those on the other. It will be understood that, in its broad aspects, the invention is not limited to the use of the bays shown and described, an alternative arrangement using molten metal electrodes being shown in my copending application of the same date of the present application and having a Serial No. 51,325, and that in other respects the invention is capable of a wide variety of specific embodiments. One form of the proposed apparatus is shown in the accompanying drawings, wherein:

Figure 1 is a vertical section through the apparatus on the line I—I of Fig. 3. Fig. 2 is a horizontal section of the line II—II of Fig. 1. Fig. 3 is a vertical section on the line III—III of Fig. 1. And Fig. 4 is a vertical section on the line IV—IV of Fig. 1.

Referring to the drawings, 1, 2 are the side walls of an elongated melting tank; 3 and 4 are the rear and forward end walls respectively; and 5 is the arch or roof of the tank. Batch is supplied to the rear end of the tank through the chute 6, and the finished glass is withdrawn continuously from the forward end of the tank through the slot 7 in the front wall 4, such wall being preferably made vertically adjustable or removable by means of chains 8 connected to a suitable overhead handling device.

The glass flowing through the slot 7 passes between the sizing rolls 9 and 10 in a continuous ribbon 11, the sizing rolls being water cooled and driven from the shaft 12 (Fig. 2) through the intermediary of the tumbler shafts 13 and suitable reducing gearing in the casings 14 and 15. The ribbon is received upon an apron provided with fluid cooled rolls 16, and passes from this apron into the leer 17, which is preferably of the roller type and is of such length that the glass is suitably annealed and cooled before reaching the far end of the leer where it is cut into sheets. Provision is made for cutting off the flow of glass to the outlet slot 7 in the form of a pair of gates or shear cakes 18 and 19, the gate 18 being water cooled and the gate 19 being of refractory material. These gates are supported by the chains 20 and 21 extending upward to a suitable handling apparatus, such as an overhead crane.

The hot gases which accumulate above the surface of the glass in the tank are carried out through the chute 6 and through the passageway 22 leading to a stack and provided with a suitable regulating damper 23. The passageway 22 is formed so as to surround the batch hopper 24 and this batch hopper is provided at its lower end with a two part gate 25, controlled from the hand lever 26 through the intermediary of the links 27, 28 and 29. This arrangement provides for utilizing the hot gases from the furnace or tank to preliminarily heat the batch, thus promoting the economy of the operation.

Opening from the sides of the tank are two pairs of bays 30, 31 and 32, 33, such bays having at their inner enlarged ends the electrodes 34, 35, 36 and 37 to which the leads 38, 39, 40 and 41 and 42, 43, 44 and 45 are connected for supplying current for reducing the batch and fining the molten glass. These electrodes are in the form of flat plates of "ascaloy" (iron about 75% and chromium about 25%) or other composition having high heat resisting properties and of a character which will not readily enter into combination with the glass at the temperatures to which the composition is exposed. The plates are backed up by the plates 46 of clay or other refractory material. These plates are relatively thin as compared with the thickness of the walls of the melting tank, so that the electrodes are maintained at a lower temperature, and hence less subject to corrosion, than would be the case if the electrodes were backed up by thick plates of clay. The use of the bays having the enlarged inner ends with the electrodes mounted in such ends also tends to prevent overheating of the electrodes as the glass in the bays, and particularly at the inner ends thereof, is substantially cooler than the glass in the body of the tank.

The current for reducing and fining the batch may be applied in a number of different ways, but single phase current is preferably used and the heating effect is secured by the passage of current between the set of terminals 38, 39, 40 and 41, which involves a flow of current longitudinally of the tank. The current may take different paths depending upon the resistance in the body of glass. It may flow between 38 and 40 and between 39 and 41 or between 38 and 41 and between 39 and 40, or may be divided between these two courses. By using current from a different circuit between the terminals 42 and 43 and 44 and 45, a direct flow of current transversely of the tank between the electrodes 34 and 35 and 36 and 37 may be secured in addition to the longitudinal flow above described, thus increasing the rapidity of the reducing action. In this circuit, a less voltage would ordinarily be used than in the circuits longitudinally of the tank, as the path between the terminals in this case is shorter and the resistance, therefore, less. It is also possible to reduce the glass without the longitudinal flow through the tank by using only the transverse flow between the terminals 42 and 43 and 44 and 45, and if desired, the number of electrodes spaced along the tank may be increased, as called for by the length of the tank or its capacity.

The different lines of flow are secured by arranging the various terminals in suitable circuits separate from each other and employing such switches and resistances as may be necessary in order to give the varying voltage which may be required. For instance, in order to give the longitudinal flow from the terminal 38 to the terminal 40 and from the terminal 39 to the terminal 41, the terminals 38 and 40 are brought into one circuit, while the terminals 39 and 40 are brought into another circuit. At the same time, if it is desired to give in addition the transverse flow, the terminals 42 and 43 are brought into a circuit independent of the two circuits just specified, while the terminals 44 and 45 are brought into a fourth independent circuit. When it is desired to direct a current diagonally from the terminal 39 to the terminal 40 and from the terminal 38 to 41, this is accomplished by bringing the terminals 39 and 40 into still another circuit and the terminals 38 and 41 into another similar one. All the various circuits may be supplied from a single generator having the number of transformer units and independent circuits, as above described.

The tank preferably tapers, as indicated in Fig. 2, so that the cross section of the tank increases from its rear end forwardly, the purpose being to equalize the heating effect of the current, the resistance to the passage of the current through the partially reduced batch being more than that through the completely reduced batch. In order to still further guard against corrosion of the electrodes at their upper ends, the top of the tank which overhangs the bays, as indicated in Fig. 4 lies at a level so that it touches the glass, thus preventing any access by the heated gases in the tank to the upper ends of the electrodes, such as would be the case if the top walls at 46 and 47 (Fig. 4) were spaced above the surface of the glass. In order to skim the glass before it reaches the outlet slot 7, a pair of floater blocks 48 and 49 (Fig. 2) are employed.

In operation, batch is fed in at the rear end of the tank through the chute 6 at a rate corresponding to the withdrawal of the finished glass from the slot 7, so that the level of the glass in the tank is maintained substantially constant. At the inception of the operation, it will be necessary to heat the batch at the rear end of the furnace between the electrodes 34 and 35 by gas burners or other suitable means in order to raise it to a temperature such that it will conduct a current between the electrodes. After the operation is started, the character and amount of the current will be regulated to meet requirements and reduce the glass and fine it at the temperature best suited for the production of a product of the required quality. After the operation is fairly started, the glass lying between the rear electrodes 34 and 35 is in molten condition, so that the incoming batch at the extreme rear end of the tank is heated and partially reduced by contact with the molten glass lying between the electrodes and the batch. The arrangement of electrodes so as to give a flow longitudinally of the tank and transversely thereof utilizes the heating energy of the current in an efficient manner and at the same time, the arrangement of bays permits of the maintenance of the electrodes at temperatures such that any contamination of the glass due to a re-action between the glass and electrodes is reduced to a point where it is negligible and there is no noticeable discoloration of the glass due to this cause. The invention contemplates the use of various heat resisting alloys for forming the electrodes, and also the use of materials other than alloys, such as carbon and the like, for this purpose, the requirement being that it shall not discolor the glass at the temperatures required by the operation. The invention in its broad form also contemplates the use of different arrangements of electrodes spaced along the length of the tank, such for instance, as that illustrated in my co-pending application heretofore referred to. The process also involves a saving in alkali, ordinarily lost and amounting to something like 15 per cent, which is condensed and returned with the incoming batch.

What I claim is:

1. In combination in apparatus for making glass, a tank having bays in its side walls, electrodes at the inner ends of such bays, and means for supplying current to the electrodes.

2. In combination in apparatus for making glass, a tank having bays in its side walls, on opposite sides thereof, electrodes at the inner ends of such bays, and means for supplying current to the electrodes.

3. In combination in apparatus for making glass, a tank having a pair of bays in spaced relation longitudinally of the tank in each of its side walls, electrodes at the inner sides of such bays, and means for supplying current to the electrodes so as to cause the flow thereof to pass through the glass longitudinally of the tank.

4. In combination in apparatus for making glass, a tank having a pair of bays in spaced relation longitudinally of the tank in each of its side walls, electrodes at the inner sides of such bays, and means for supplying current to the electrodes so as to cause the flow thereof to pass through the glass longitudinally of the tank and also transversely thereof.

5. In combination in apparatus for making glass, a tank having bays in its side walls, electrodes at the inner ends of such bays, with the entrance or throat portions thereof narrower than the end portions, electrodes at the inner ends of the bays, and means for supplying current to the electrodes.

6. In combination in apparatus for making glass, a tank having bays in its side walls, electrodes at the inner ends of such bays, and means for supplying current to the electrodes, the walls at the inner ends of the bays being thinner than the side walls of the tank to promote the cooling of the electrodes.

7. In combination in apparatus for making glass, a melting tank arranged to receive batch at one end and to deliver molten glass at the other end, a pair of electrodes in each of the opposite side walls of the tank with the members of each pair in spaced relation longitudinally thereof, and means for supplying current to the electrodes so as to cause the flow thereof to pass through the glass longitudinally of the tank.

8. In combination in apparatus for making glass, a melting tank arranged to receive batch at one end and to deliver molten glass at the other end, a pair of electrodes in each of the opposite side walls of the tank with the members of each pair in spaced relation longitudinally thereof, and means for supplying current to the electrodes so as to cause the flow thereof to pass through the glass longitudinally of the tank, and also transversely thereof.

9. In combination in apparatus for making glass, a melting tank arranged to receive batch at one end and to deliver molten glass at the other end, a pair of electrodes in each of the opposite side walls of the tank with the members of each pair in spaced relation longitudinally thereof and means for supplying current to the electrodes so as to cause the flow thereof to pass through the glass longitudinally of the tank, the tank being tapered in form so that it decreases in vertical cross section from the rear electrodes of said pairs to the forward ones.

10. In combination in apparatus for making glass, a melting tank arranged to receive batch at its rear end and to deliver molten glass at its forward end, means for causing electric current to flow through the glass in the tank to heat it, means for supplying batch to said rear end of the tank, and means for applying the heated gases above the glass in the tank to the incoming batch so as to heat the same.

11. In combination in apparatus for making glass, a melting tank arranged to receive batch at its rear end and to deliver molten glass at its forward end, means for causing electric current to flow through the glass in the tank to heat it, a chute for supplying batch to said rear end of the tank, and means for withdrawing the heated gases lying in the tank above the glass through such chute so as to preliminarily heat the batch.

12. In combination in apparatus for making glass, a melting tank arranged to receive batch at its rear end and to deliver molten glass at its forward end, means for causing electric current to flow through the glass in the tank to heat it, a batch hopper with an inclined chute leading to the rear end of the tank, and means for withdrawing the heated gases in the tank lying above the glass through such chute and around said hopper so as to preliminarily heat the batch.

13. A process of making glass which consists in supplying batch to one end of a tank, withdrawing the molten glass from the other end and heating the batch and molten glass by causing electric current to flow therethrough longitudinally of the tank.

14. A process of making glass, which consists in supplying batch to one end of a tank, withdrawing the molten glass from the other end and heating the batch and molten glass by causing electric current to flow therethrough longitudinally of the tank and transversely thereof.

In testimony whereof, I have hereunto subscribed my name this 18th day of July, 1925.

HARRY F. HITNER.